United States Patent [19]

Szydlowski et al.

[11] Patent Number: 4,737,161
[45] Date of Patent: Apr. 12, 1988

[54] COMPACT HYDROGEN GENERATOR

[75] Inventors: Donald F. Szydlowski, Ellington; George T. Suljak, Vernon, both of Conn.

[73] Assignee: International Fuel Cells Corporation, South Windsor, Conn.

[21] Appl. No.: 7,043

[22] Filed: Jan. 27, 1987

[51] Int. Cl.$^4$ .................................................. B01J 7/00
[52] U.S. Cl. .................................................. 48/61; 48/94; 48/102 R; 48/102 A; 422/204; 422/211; 422/312
[58] Field of Search ............... 48/61, 102 R, 102 A, 48/189.4, 94, 105; 422/193, 204, 205, 211; 423/651; 429/20

[56] References Cited

U.S. PATENT DOCUMENTS

| | | | |
|---|---|---|---|
| 3,357,916 | 12/1967 | Smith | 208/120 |
| 3,516,807 | 6/1970 | West et al. | 48/107 |
| 3,635,682 | 1/1972 | Vine et al. | 422/204 |
| 3,909,299 | 9/1975 | Corrigan | 422/211 |
| 4,011,904 | 3/1977 | Hope et al. | 165/108 |
| 4,430,304 | 2/1984 | Spurrier et al. | 422/204 |
| 4,455,152 | 6/1984 | Hansen | 48/61 |
| 4,588,659 | 5/1986 | Abens et al. | 48/61 |

Primary Examiner—Barry S. Richman
Assistant Examiner—Joye L. Woodard
Attorney, Agent, or Firm—William W. Jones

[57] ABSTRACT

The device catalytically reforms a raw hydrocarbon fuel to a hydrogen rich gas for fueling a fuel cell stack. The device is compact so as to be usable in mobile or temporary applications, such as in vehicles, trailors, as an emergency generator or the like. The device has generally cylindrical housing with an axial burner and a helical catalyst tube outside of the burner and inside of the housing. A refractory heat shield sleeve is interposed between the burner and the helical tube so that heat from the burner progresses to one end of the housing and then passes between the heat shield and housing side wall to envelop the catalyst tube. A gas deflector and swirler may be disposed at the end of the heat shield to properly direct the hot gases from the burner to the catalyst tube. Raw fuel is percolated through the catalyst tube and converted therein to a hydrogen rich gaseous fuel.

3 Claims, 2 Drawing Sheets

COMPACT HYDROGEN GENERATOR

This invention was made with Government support under a contract awarded by the Department of the Army. The Government has certain rights in this invention.

TECHNICAL FIELD

This invention relates to a hydrocarbon fuel reformer for producing a hydrogen-rich fuel for a fuel cell stack or the like. More particularly, this invention relates to a reformer of the character described which is compact in size so as to be usable in very specialized applications.

BACKGROUND ART

Electricity generating fuel cell stacks are typically fueled by hydrogen-rich fuel gases which are synthesized in the fuel cell power plant system by catalytically reforming a raw hydrocarbon fuel. The raw fuel is passed through a catalyst bed which is heated and the resultant gas evolved by the catalyst bed is the hydrogen-rich fuel gas suitable for fueling fuel cell power plants. Ordinarily, the catalyst bed is formed by a plurality of elongated, parallel tubes which are disposed in a reformer housing and which contain the catalyst. The tubes are heated by a burner or the like associated with the reformer housing, and the raw fuel is fed into one end of the tubes with the reformed fuel gas emerging from the tubes. The aforesaid reformer construction is perfectly acceptable for larger fuel cell power plants of the type which will provide electrical power for a building, or which will be used to provide line power by an electric utility. There are, however, fuel cell power applications in which the parallel tube reformer construction is not satisfactory.

These are situations where the power plant must be relatively compact, as, for example, in a vehicle, trailor, portable generator or the like. When such compactness is a requirement, the conventional parallel tube reformers have been found to be inefficient with respect to heat utilization. They have been found to suffer from hot and cold spots to the extent that the operating temperatures must be raised to levels which are deleterious to the catalyst over extended periods of time.

DISCLOSURE OF INVENTION

The reformer of this invention is of compact construction and can be housed in a cylindrical container which is about seven inches in diameter and about one foot in height. The reformer of this invention is provided with a burner which is coaxial with the cylindrical housing, and which is shielded from the side wall of the housing by an insulating refractory sleeve. The refractory sleeve is spaced outwardly of the burner, and spaced inwardly of the side wall of the cylindrical housing so as to form with the latter an annular heating chamber inside of the housing. There is disposed in the annular heating chamber a helical catalyst tube which extends from one end of the cylindrical housing to the other. Catalyst pellets are packed into the helical tube, and the latter is provided with a raw fuel inlet at one end and a reformed fuel outlet at the other end. A flame swirler and hot gas deflector are provided inside of the refractory sleeve downstream of the burner to create turbulence in the heated gas and to ensure even flow of the heated gas into the annular heating chamber. The reformer is heated with an auxiliary heater during start-up and then with the burner during normal operation. The provision of the restricted heating chamber and the helical catalyst tube allows the reformer of this invention to be operated at significantly lower temperatures thus extending catalyst life.

It is, therefore, an object of this invention to provide a reformer for use in a fuel cell power plant for reforming raw hydrocarbon fuel into hydrogen-rich fuel for use with fuel cells.

It is a further object of this invention to provide a reformer of the character described which is compact and suitable for use with small mobile fuel cell power plants.

It is an additional object of this invention to provide a reformer of the character described which includes a restricted heating chamber separated from an adjacent burner by an insultating sleeve.

It is another object of this invention to provide a reformer of the character described which includes a helical catalyst tube positioned in the heating chamber.

These and other objects and advantages of the invention will become more readily apparent from the following detailed description of a preferred embodiment of the device when taken in conjunction with the accompanying drawings.

BEST MODE FOR CARRYING OUT THE INVENTION

Figure 1:
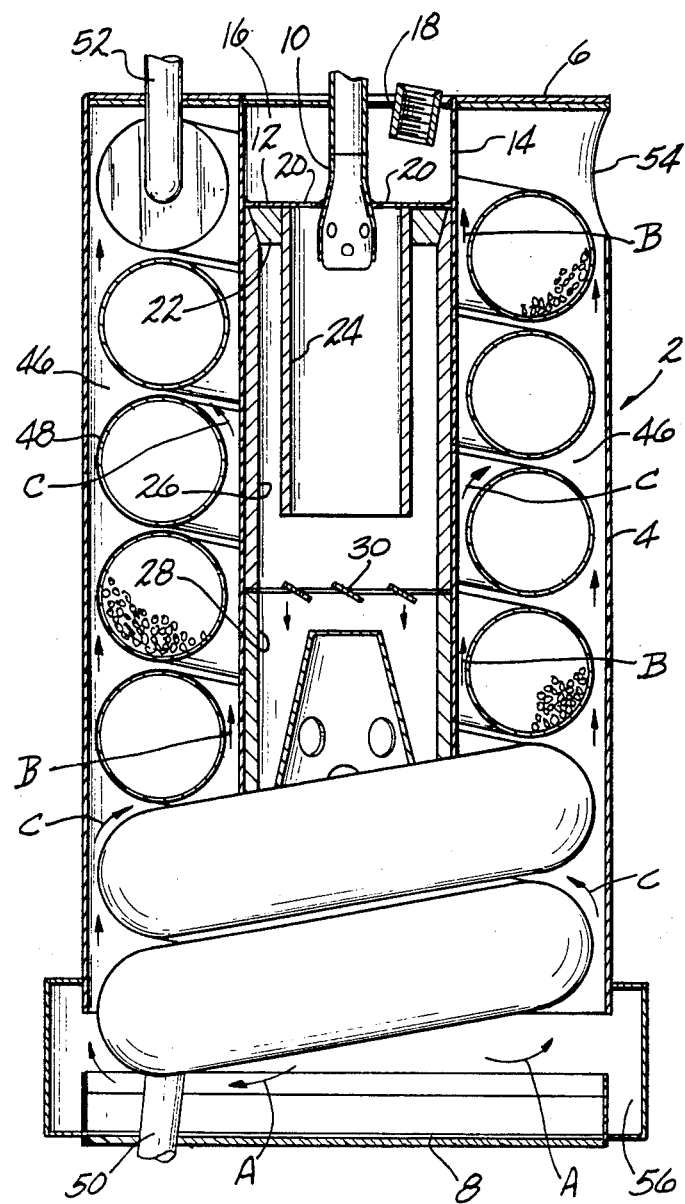
FIG. 1 is an axial sectional view, partly broken away of a preferred embodiment of a reformer made in accordance with this invention.

Referring now to FIG. 1, there is shown a reformer denoted generally by the numeral 2 which is constructed in accordance with this invention. The reformer includes a housing having a cylindrical side wall 4 and end closure walls 6 and 8. The reformer housing is about seven inches in diameter and about twelve inches in height and is encased in external thermal insulation (not shown) when in use. A burner nozzle 10 opens into the interior of the housing through the end wall 6, the burner 10 being coaxial with the cylindrical side wall 4 of the housing. The burner 10 extends through a disk 12 which is mounted in a flame tube 14 extending into the housing from the end wall 6. The chamber 16 bounded by the end wall 6, the disk 12, the flame tube 14 and the burner 10 is an ignition chamber for the burner 10. A spark plug fitting 18 is mounted on the end wall 6 for reception of a spark plug which will project into the chamber 16 for ignition of burner gas which enters the chamber 15 via openings 20 in the disk 12. A collar 22 is mounted on the disk 12 and houses a tube 24 which projects into the housing past the end of the burner 10. Mounted in the flame tube 14 outwardly of the tube 24 are refractory heat insulating sleeves 26 and 28. Sandwiched between the sleeves 26 and 28 in the tube 14 is a flame swirling nozzle 30.

Figure 2:
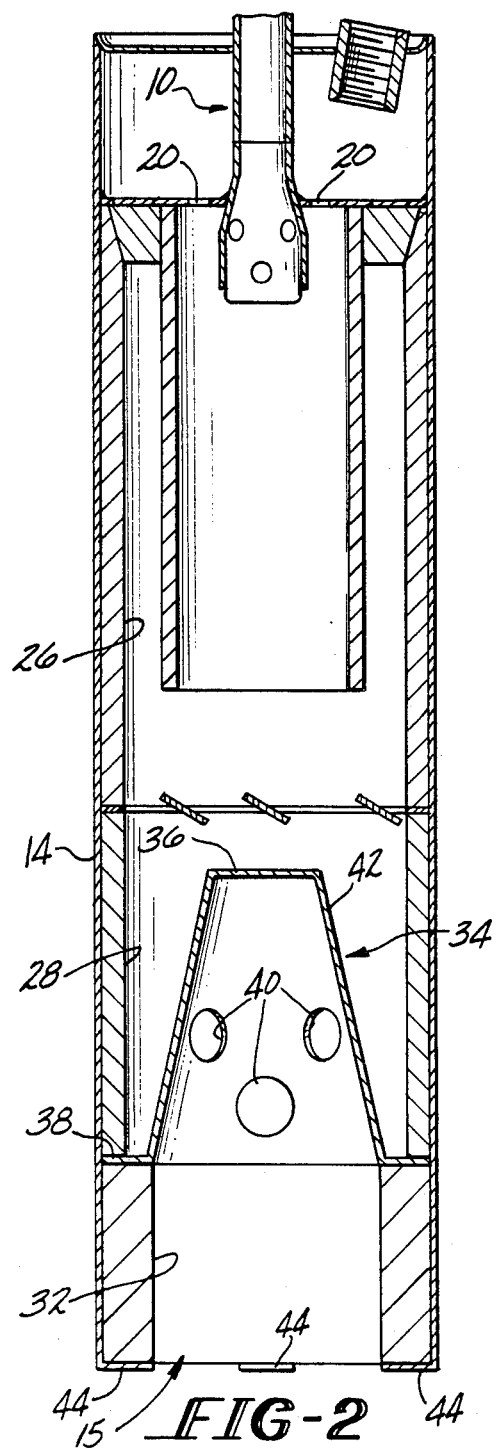
FIG. 2 is an axial sectional view of the burner/insulating sleeve/gas diverter subassembly of the reformer of FIG. 1.

Referring now to FIG. 2, disposed in the open end 15 of the tube 14 is an insulation sleeve 32 upon which is positioned a hot gas spreader 34. The spreader 34 is frustoconical in shape and includes a flat closed end wall 36 facing the burner 10, and an annular foot 38 sandwiched between the insulating sleeves 28 and 32. A plurality of nozzle apertures 40 are formed in the spreader side wall 42. Inwardly bent tabs 44 at the open end of the tube 14 serve as retainers for the contents of the tube 14.

Referring back to FIG. 1, it will be noted that the housing side wall 4 and the sleeve 14 combine to form an annular heating chamber 46 which lies outwardly of the burner 10 and which is insulated from the flame tube 24 and the interior of the tube 14 by the thermal insulation 26 and 28. The open end 15 of the tube 14 is spaced from the closed end 8 of the housing so as to establish communication between the central flame-containing part of the reformer and the heating chamber 46. A helical catalyst tube 48 is disposed in the heating chamber 46 extending from one end of the heating chamber 46 to the other. Catalyst pellets are packed into the tube 48 for the entire length thereof, and an inlet pipe 50 extends through the housing end wall 8 and opens into one end of the tube 48. Likewise, an outlet pipe 52 extends through the opposite housing end wall 6 and opens into the other end of the tube 48. At the end of the housing where the burner 10 is disposed, an exhaust port 54 for burner gases opens through the side wall 4 of the housing. Disposed at the end of the housing opposite the burner 10 is an annular manifold 56 which receives heated gas from a start-up heater (not shown) to bring the catalyst bed up to temperature before the burner 10 is ignited. Using the configuration shown in the drawings, the reformer can operate with an average catalyst temperature of about 486° F. because of the even and thorough heat transfer achieved by isolating the helical catalyst tube in the separate heating chamber in the housing. Comparable operation of a conventional straight parallel tube configuration requires average catalyst temperatures of about 526° F. to ensure proper operating conditions due to the formation of hot and cold spots in the catalyst bed. These higher average catalyst temperatures required by the prior art reformer configurations shorten the effective life of the catalyst.

The device operates as follows. Start-up hot gases are delivered to the heating chamber 46 from the auxiliary heater via the annular manifold 56. Once the catalyst bed has reached operating temperatures, the burner 10 is ignited and its flame is projected through the tubes 24 and 14, and through the swirler 30. Swirling hot gases impinge the spreader 34 and are transformed into turbulent jets by passing through the nozzle apertures 40. The hot gases then proceed radially outwardly, as shown by arrows A in FIG. 1, and traverse the heating chamber 46. The hot gases are exhausted through port 54. The path taken by the hot gases through the heating chamber 46 is diverse. They will pass through the chamber 46 between the helix 48 and the tube 14 per arrows B, and they will also pass between the coils per arrows C. This separation of the heating chamber 46 from the interior of the flame tube 14 by the insulation 26 and spreader 34 ensures that hot spots will not occur in the catalyst bed. The turbulence imparted to the hot burner gases ensure a more complete envelopment of the helix by the heat, so that cold spots are not present in the catlyst bed. The tortuous path presented to the raw fuel vapors by the helical tube ensures that adequate contact between the vapors and the catalyst will ensue so that the reformation of the fuel will be complete.

It will be readily appreciated that the reformer of this invention will provide superior performance, even though being of compact construction, and is readily usable in situations which require portability or mobility. The device can operate with lower catalytic bed temperatures than miniaturized reproductions of conventional parallel tube reformers, and is of a simpler construction requiring fewer weld joints.

Since many changes and variations of the disclosed embodiment of the invention may be made without departing from the inventive concept, it is not intended to limit the invention otherwise than as required by the appended claims.

What is claimed is:

1. A compact reformer for use in reforming a raw hydrocarbon fuel into a hydrogen rich fuel gas suitable for use in a mobile fuel cell power plant, said reformer comprising:
   (a) a housing having a cylindrical side wall and opposed end walls;
   (b) a burner opening into said housing through one of said end walls, said burner being coaxial with said cylindrical side wall;
   (c) an annular thermally insulated flame tube surrounding said burner and extending from said one of said end walls toward the other of said end walls, and said flame tube having an open end remote from said one of said end walls and spaced apart from said other of said end walls;
   (d) a heating chamber radially inwardly bounded by said flame tube and radially outwardly bounded by said cylindrical side wall of said housing, said heating chamber communicating with said open end of said flame tube whereby hot gases from said burner can enter said heating chamber via said open end of said flame tube;
   (e) a helical tube disposed in said heating chamber and extending from one end to the other of said heating chamber, said helical tube containing a catalyst operable to reform raw hydrocarbon fuels to hydrogen rich gases;
   (f) a fuel inlet extending through a wall of said housing and opening into an end of said helical tube remote from said burner and operable to supply raw hydrocarbon fuel to the interior of said helical tube; and
   (g) an outlet extending through a wall of said housing and opening into an end of said helical tube proximate said burner and operable to duct reformed hydrogen rich fuel gas from said helical tube.

2. The reformer of claim 1 further comprising a flame swirler mounted in said flame tube between said burner and said open end of said flame tube to impart turbulence to hot flame gases issuing from said burner.

3. The reformer of claim 2 further comprising gas spreader nozzle means mounted in said flame tube between said swirler and said open end of said flame tube for jetting hot gases through said open end of said flame tube and radially outwardly into said heating chamber.

* * * * *